(12) United States Patent
Wauke

(10) Patent No.: US 6,774,520 B2
(45) Date of Patent: Aug. 10, 2004

(54) THIN INNER ROTOR MOTOR AND DISK DEVICE USING THE MOTOR

(75) Inventor: Tomokuni Wauke, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 57 days.

(21) Appl. No.: 10/072,482

(22) Filed: Feb. 7, 2002

(65) Prior Publication Data

US 2002/0117910 A1 Aug. 29, 2002

(30) Foreign Application Priority Data

Feb. 23, 2001 (JP) ........................................ 2001-049349

(51) Int. Cl.[7] .............................................. H02K 7/00
(52) U.S. Cl. .................. 310/156.45; 310/216; 310/254; 310/67 R; 310/156.46; 310/40 MM; 360/98.07
(58) Field of Search ........................... 310/156, 156.43, 310/156.45, 218, 156.44, 67 R, 254, 216, 40 MM

(56) References Cited

U.S. PATENT DOCUMENTS

| | | | | |
|---|---|---|---|---|
| 4,620,301 A | * | 10/1986 | Koide ........................ 360/86 |
| 4,769,567 A | * | 9/1988 | Kurauchi et al. ...... 310/156.45 |
| 5,304,878 A | * | 4/1994 | Oda et al. ................ 310/67 R |
| 5,345,133 A | * | 9/1994 | Satake ................... 310/156.46 |
| 5,350,990 A | * | 9/1994 | Austermann et al. ....... 318/701 |
| 5,418,416 A | | 5/1995 | Muller ....................... 310/186 |
| 5,432,644 A | * | 7/1995 | Tajima et al. .......... 310/156.26 |
| 5,453,972 A | * | 9/1995 | Kanazawa et al. .......... 369/219 |
| 6,181,047 B1 | * | 1/2001 | Nitta .......................... 310/254 |
| 6,384,502 B1 | * | 5/2002 | Masuzawa et al. ......... 310/152 |
| 6,552,461 B2 | * | 4/2003 | Takahata et al. ........... 310/254 |

FOREIGN PATENT DOCUMENTS

| JP | 4-178161 | 6/1992 | .......... H02K/29/08 |
|---|---|---|---|
| JP | 272023 A | * 9/2002 | ............ H02K/1/16 |

* cited by examiner

Primary Examiner—Burton S. Mullins
Assistant Examiner—Yahveh Comas
(74) Attorney, Agent, or Firm—Brinks Hofer Gilson & Lione

(57) ABSTRACT

An inner rotor motor includes a rotor which has a plurality of circumferentially arranged magnetic poles and a stator which is positioned outside a circumference of the rotor and has a stator core which includes a plurality of magnetic pole teeth which face the rotor in an opposed manner and arranges coils for respective magnetic pole teeth. In such a constitution, the stator is arranged within a center angle of 180° with respect to a center of rotation of the rotor. Further, pitches of the magnetic pole teeth in the rotor circumferential direction along which respective rotor facing surfaces of the magnetic pole teeth are arranged are set smaller than pitches of the rotor in the rotor circumferential direction along which the magnetic poles of the rotor are arranged.

3 Claims, 10 Drawing Sheets

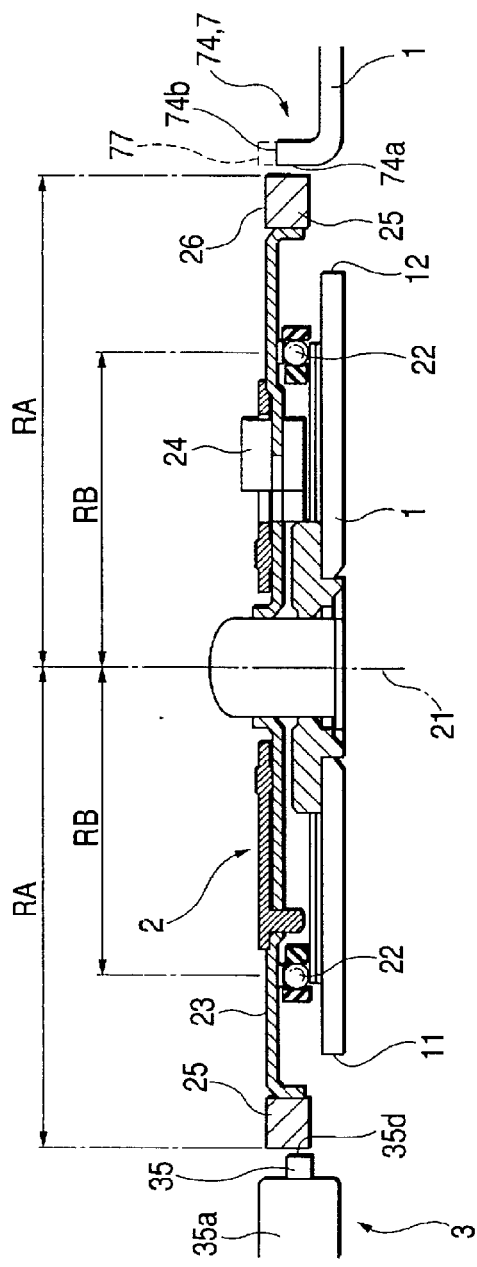
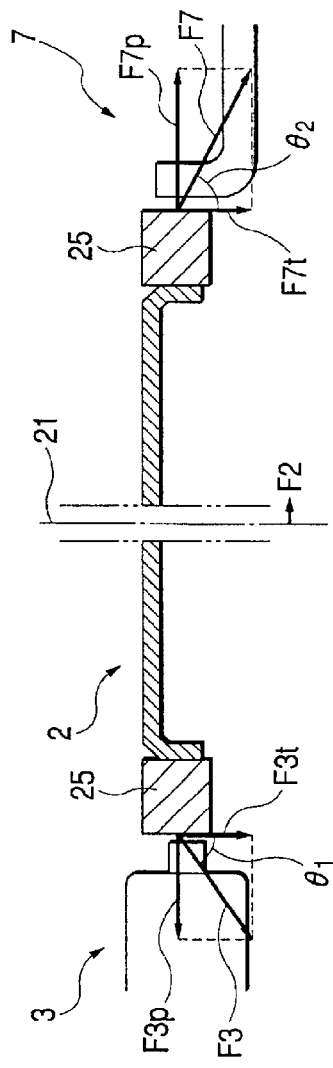
FIG. 2A
FIG. 2B

THIN INNER ROTOR MOTOR AND DISK DEVICE USING THE MOTOR

BACKGROUND OF THE INVENTION

1. Field of the Invention

The present invention relates to a technique which can be preferably used for a thin inner rotor motor for rotatably driving a medium which is used in a floppy disk driving device or the like, for example.

2. Description of the Prior Art

A disk device such as a floppy disk device has been popularly used in an office computer, a word processor and the like in addition to a personal computer and the application of the disk device has been spreading. This type of disk device is constituted as shown in FIG. 10, for example.

To explain the general construction of the disk device based on the drawing, in the drawing, numeral 101 indicates a chassis having a spindle center 102 as the center of rotation of a disk. The chassis 101 is housed in the inside of an equipment housing (not shown in the drawing) of a personal computer or the like, for example, and is formed in a bottomed box having a housing space which opens at a front side and an upper side as the entire configuration. A disk cartridge 103 faces the housing space.

A stepping motor 124 for feeding a head carriage and a head carriage which is arranged to be reciprocated in the back and forth direction by the stepping motor 124 are mounted on a rear end of the chassis 101. A first head 130 for reading recorded information on a disk is held at a distal end of the head carriage, while a head arm 132 having a second head 131 which corresponds to the first head 130 is tiltably mounted on a rear upper end of the head carriage by way of a resilient body. The head arm 132 is biased in the direction that the second head 131 approaches the first head 130. This type of disk device is further provided with a cartridge holder 136 for holding the disk cartridge 103 such that the disk cartridge 103 can be inserted and removed and a mechanism for opening and closing a shutter of the disk cartridge 103.

Here, as this type of disk device, to cope with the recent requirement for thin configuration of the disk drive, a disk device which is provided with an inner rotor motor shown in FIG. 11A and FIG. 11B as a motor for rotating a disk has been adopted.

This inner rotor motor is constituted of a stator 164 which includes an annular yoke 161 extending in the circumferential direction and a large number of cores 163 which are radially mounted on an inner peripheral surface of the yoke 161 and around which coils 162 are wound, and a rotor 166 which is rotatably arranged in an inner periphery of the stator 164 and having an annular magnet 165 which faces the cores 163 in an opposed manner. Further, in the drawing, numeral 168 indicates a circuit board on which a holding portion 170 which incorporates a bearing 169 therein is mounted, and numeral 171 indicates a rotary shaft for fixing rotor which is rotatably supported on the holding portion 170 on the circuit board 168 by way of the bearing 169 and has an axis extending in the vertical direction. Here, the rotor 166 of the inner rotor motor functions as a turn table which has a magnet for chucking disk (not shown in the drawing) and a rotary lever for chucking disk (not shown in the drawing).

With respect to the stator 164 for this type of inner rotor motor, the yoke 161 and the cores 163 are arranged to surround substantially the entire periphery of the rotor 166 except for a position where the heads 130, 131 move. To satisfy the required magnetic characteristics to these elements, they are formed of silicon steel which is costly compared to galvanized steel plate which constitutes the chassis 101 and the like.

However, with respect to this type of disk device, there has been a continuing demand for the reduction of the manufacturing cost. Further, the demand for making the device small-sized and light-weighted has been still strong.

Accordingly, the inventors of the present invention consider that there has been a demand for the reduction of areas of the yoke 161 and the cores 163 made of the expensive silicon steel with respect to the stator 164 for the inner rotor motor.

However, when the areas of the yoke 161 and the cores 163 are reduced to meet the abovementioned requirement, the magnetic interaction with respect to the rotor 166 becomes non-uniform in the circumferential direction so that there exists a possibility that the operational stability of the disk cannot be ensured.

Further, with respect to the inner rotor motor which is driven with three phases, for example, it is demanded to establish a state in which the coils which correspond to respective phases uniformly act on the rotor.

SUMMARY OF THE INVENTION

The present invention has been made in view of the abovementioned circumstances and has been provided to achieve following objects.

(a) Reduction of manufacturing cost (b) Making device small-sized and light-weighted (c) Maintenance of stability of rotation of motor (d) Enhancement of operational stability of disk device To achieve the abovementioned objects, the present invention provides an inner rotor motor comprising a rotor which includes a plurality of magnetic poles arranged circumferentially and a stator which is positioned outside a circumference of the rotor, has a stator core which includes a plurality of magnetic pole teeth which face the rotor in an opposed manner and arranges coils on respective magnetic pole teeth, wherein pitches of the magnetic pole teeth in the rotor circumferential direction along which respective rotor facing surfaces of the magnetic pole teeth are arranged are set smaller than pitches of the rotor in the rotor circumferential direction along which the magnetic poles of the rotor are arranged.

In the present invention, it is desirable that the pitches of the rotor in the rotor circumferential direction along which the magnetic poles of the rotor are arranged are preferably set 1.5 times greater than the pitches of the magnetic pole teeth in the rotor circumferential direction along which respective rotor facing surfaces are arranged.

The stator of the present invention is preferably arranged within 180° with respect to a center angle of the rotor.

In the present invention, six magnetic pole teeth are preferably provided.

A disk device according to the present invention is provided with the abovementioned inner rotor motor.

According to the present invention, the pitches of the magnetic pole teeth in the rotor circumferential direction along which respective rotor facing surfaces of the magnetic pole teeth are arranged are set smaller than the pitches of the rotor in the rotor circumferential direction along which the magnetic poles of the rotor are arranged. Accordingly, compared to a case in which the magnetic pole teeth are provided with the pitches which are equal to or greater than the pitches of the magnetic poles of the rotor, the area of the magnetic pole teeth can be reduced and, at the same time, the area of portions which connect the magnetic pole teeth, that is, a yoke, can be reduced whereby the stator can be miniaturized and, at the same time, winding portions of the coils can be miniaturized thus leading to the reduction of the manufacturing cost. In other words, since the angular density of the arrangement of magnetic pole teeth with respect to the center angle of the center of rotation of the rotor can be set larger than the angular density of the arrangement of magnetic poles of the rotor, the size of the whole stator can be reduced while ensuring a fixed number of magnetic pole teeth of the stator.

Further, the coils of the present invention include U phase coils to which a first driving current is supplied, V phase coils to which a second driving current having a phase advanced by 120° compared to the first driving current is supplied and W phase coils to which a third driving current which has a phase advanced by 120° compared to the second driving current is supplied, and respective coils are arranged in the order of the U phase, the W phase and the V phase. Accordingly, the inner rotor motor of the present invention can control the driving currents in the same manner as a conventional three-phase motor and can drastically reduce the width of coils, that is, the area of magnetic pole teeth compared to the motor in which the U phase coils, the V phase coils and the W phase coils are arranged in the order of the U phase, the V phase and the W phase.

Further, according to the present invention, the pitches of the rotor in the rotor circumferential direction along which the magnetic poles of the rotor are arranged can be set 1.5 times greater than the pitches of the magnetic pole teeth in the rotor circumferential direction along which respective rotor facing surfaces are arranged. Accordingly, the width of coils can be set to two third of the width of coils of a conventional motor so that the inner rotor motor can be miniaturized and, at the same time, the area of the magnetic pole teeth can be reduced thus leading to the reduction of the manufacturing cost.

Further, in the present invention, the magnetic pole teeth can make the pitches of distal ends thereof in the circumferential direction which are expressed as center angles with respect to the center of rotation of the rotor to 15°.

Further, in the present invention, the stator is arranged in the range within 180° with respect to the center angle of the rotor. Accordingly, compared to a structure in which the stator is provided along the entire periphery of the rotor as in the case of a conventional inner rotor motor, the area of the stator core can be reduced to approximately not more than half so that the cost incurred by the stator core made of silicon steel, for example, and the cost incurred by the winding of the coil or the like can be reduced whereby the manufacturing cost of the inner rotor motor can be reduced. At the same time, compared to the case in which the stator is provided to the entire periphery of the rotor, the area necessary for mounting the motor can be reduced so that the inner rotor motor can be miniaturized and can be light-weighted due to the reduction of the number of magnetic pole teeth.

Here, in addition to the state in which the stator is continuously arranged within the center angle of 180°, it is possible that the sum of center angles of portions where a plurality of stators which are arranged in a spaced apart manner is within 180°. Further, by arranging the stator in a range within 90° with respect to the center angle of the rotor, further reduction of the manufacturing cost, further reduction of weight and further miniaturization of the inner rotor motor can be obtained.

In the present invention, by providing six magnetic pole teeth to the stator, the present invention is applicable to a three-phase inner rotor motor.

BRIEF EXPLANATION OF THE DRAWINGS

FIG. 2A is a cross-sectional view taken along a line IIA—IIA of FIG. 1 showing a cross-section of the inner rotor motor.

FIG. 2B is an enlarged cross-sectional view showing a portion in the vicinity of a magnet 25 in FIG. 2A.

PREFERRED EMBODIMENTS OF THE PRESENT INVENTION

One embodiment of an inner rotor motor and a disk device according to the present invention is explained in conjunction with attached drawings hereinafter.

Figure 1:
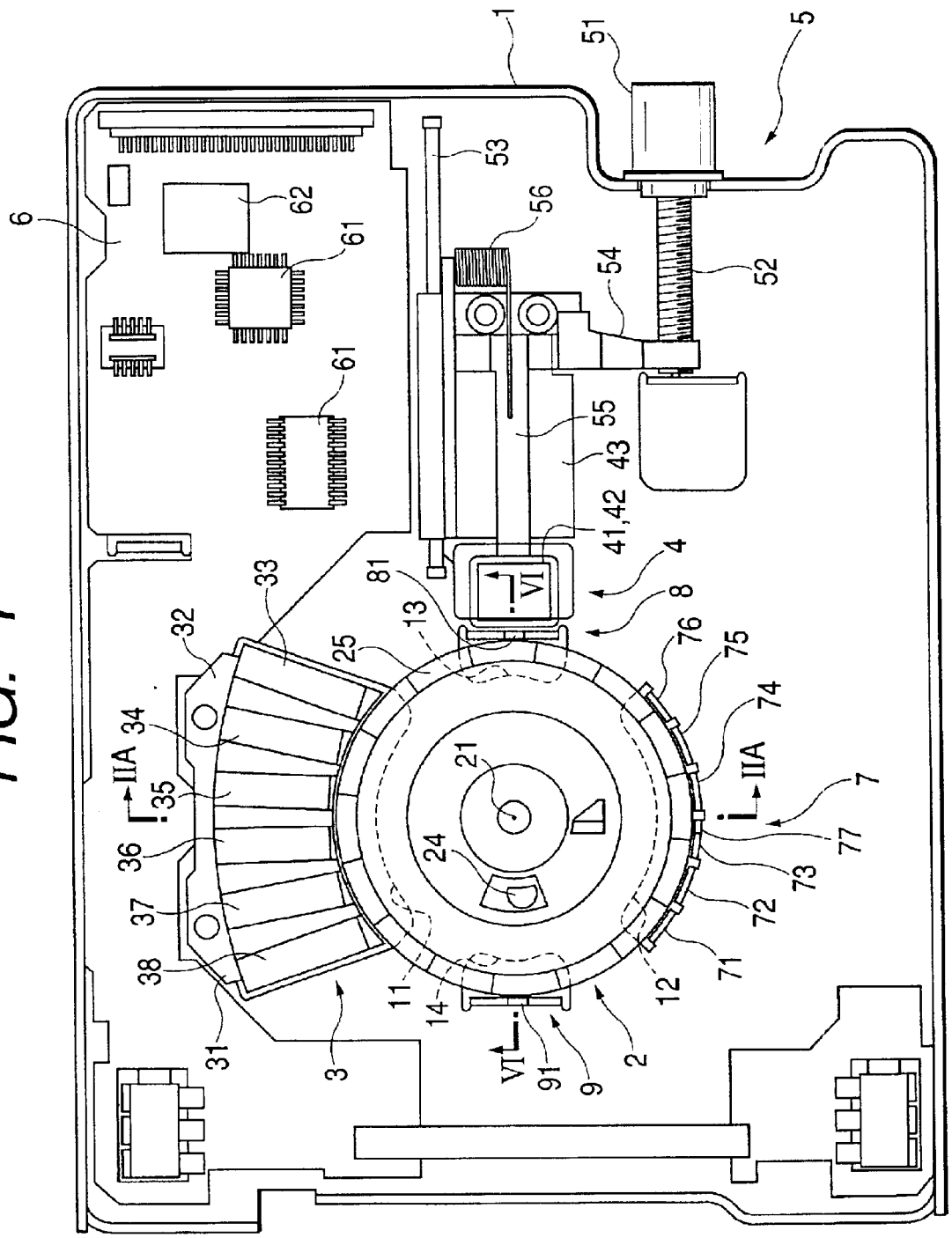
FIG. 1 is a plan view showing one embodiment of an inner rotor motor and a disk device according to the present invention.

FIG. 1 is a plan view showing a portion of a disk device according to this embodiment. In the drawing, numeral 1 indicates a chassis which constitutes a portion of a housing of the disk device.

The disk device according to this embodiment constitutes an example of the disk device which is used as a floppy disk drive (FDD).

On the chassis 1 made of galvanized steel plate or the like, as shown in FIG. 1, a rotor 2 and a stator 3 in an inner rotor motor for rotating a magnetic recording medium (disk), a magnetic head 4 for reading and writing magnetic signals to and from the disk, a position controller 5 which performs a position control of the magnetic head 4, a board 6 which functions as a controller for performing a drive control of the position controller 5 and the inner rotor motor, a magnetic balancer 7, a magnetic shield 8, and a magnetic balancer 9 are mounted.

FIG. 2A is a cross-sectional view taken along a line IIA—IIA of FIG. 1 for showing a cross-section of the inner rotor motor in FIG. 1, and FIG. 2B is an enlarged cross sectional view showing a portion in the vicinity of the magnet 25 in FIG. 2A.

As shown in FIG. 1, FIG. 2A and FIG. 2B, the rotor 2 is constituted of a disk 23 which is rotatably supported on the chassis 1 such that the disk 23 is rotatable about a spindle center 21 which is fixed to a bottom surface of the chassis 1 by way of ball bearings 22, 22 and the like along a plane parallel to the bottom surface of the chassis 1, an engaging projection 24 which is projected from an upper surface of the disk 23 and is engaged with an engaging hole of the floppy disk to transmit a rotational driving force to the floppy disk, and the magnet 25 which is provided to a periphery of the disk 23 with some thickness and includes a plurality of magnetic poles arranged in a circumferential direction.

Figure 5:
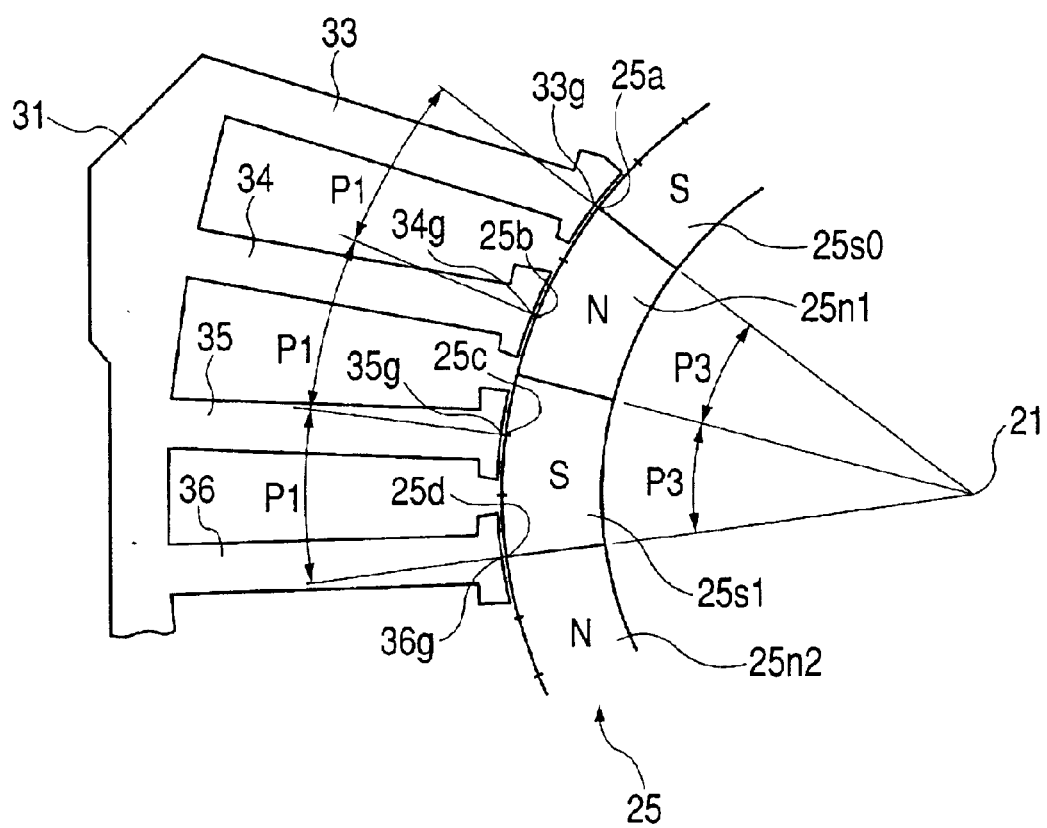
FIG. 5 is a schematic plan view showing the relationship between the magnet 25 and magnetic pole teeth 33 to 38 in FIG. 1.

As shown in FIG. 1 and FIG. 5, in the magnet 25, N poles and S poles are alternately arranged in the circumferential direction, wherein the total number of these magnetic poles is set to 16 poles, for example. That is, the magnetic poles 25n, 25s, . . . are alternately arranged with respect to the center of rotation 21 with each angle of 22.5°.

Figure 3:
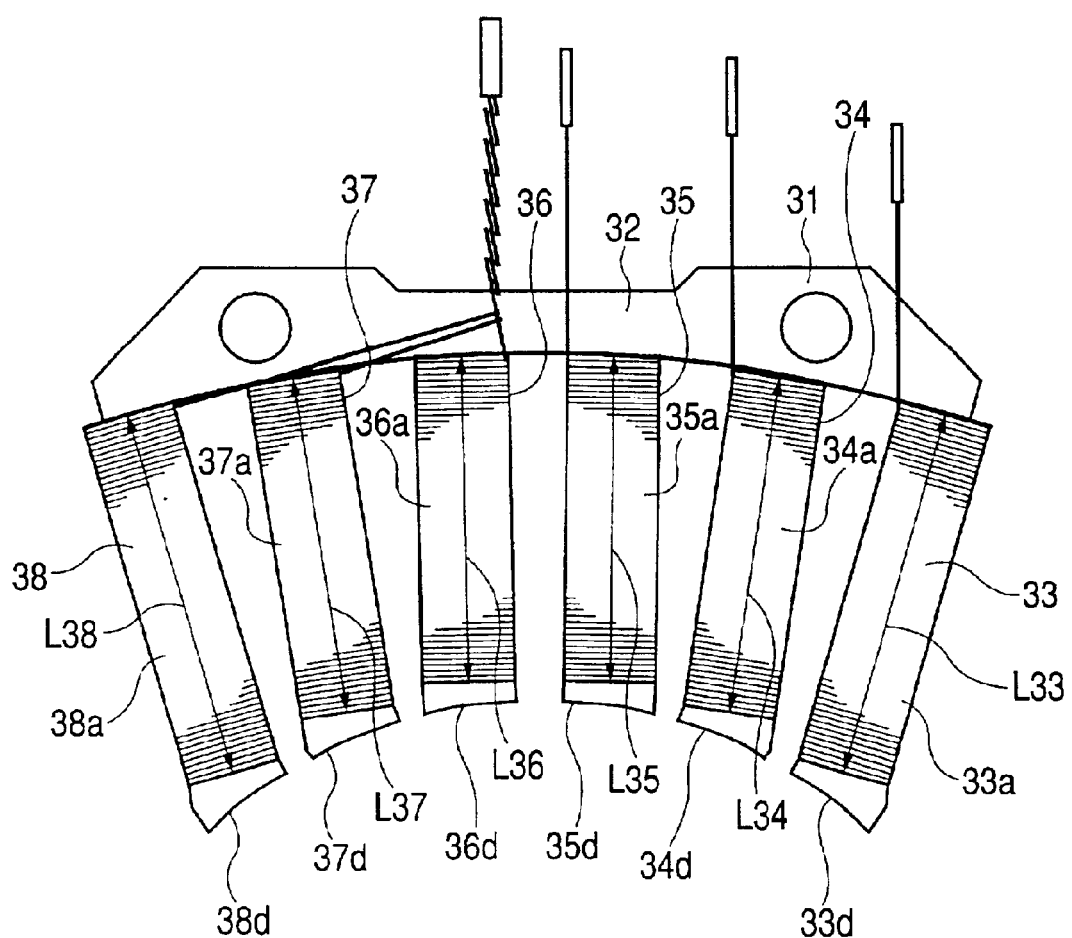
FIG. 3 is a plan view showing a stator 3 in FIG. 1.

FIG. 3 is a plan view showing the stator 3 in FIG. 1.

As shown in FIG. 1, FIG. 2A, FIG. 2B and FIG. 3, the stator 3 includes a stator core 31 which is constituted of a yoke 32 and six magnetic pole teeth 33, 34, 35, 36, 37, 38 which are connected to each other by means of the yoke 32. Coils 33a to 38a are formed by providing windings to respective magnetic pole teeth 33 to 38. The stator 3 is mounted on the chassis 1 by way of the yoke 32 and coils 33a to 38a are positioned to correspond to a notch 11 of the chassis 1 which is formed from the rotary lower-side position to the side position of the rotor 2.

The notch 11 is formed from a position where the stator core 31 is mounted on the chassis 1 to the rotary lower-side position of the magnet 25 of the rotor 2 having a shape which allows the notch 11 to accommodate the coils 33a to 38a in the inside thereof. Here, the shape of the notch 11 is determined such that the coils 33a to 38a can be accommodated while taking the strength of the chassis 1 into consideration in view of the positional relationships of the notch 11 with notches 12, 13, 14 which will be explained later.

Here, the profile of the notch 11 at the lower-side position of the rotary position of the rotor 2 is set symmetrical with the profile of the notch 12 at the lower-side position of the rotary position of the rotor 2 which will be explained later with respect to the center of rotation 21. By setting the shapes of the stator core 31 and the magnetic balancer 7 which will be explained later together with the abovementioned setting of the profiles, the magnetic flux from the magnet 25 reaches the bottom surface of the chassis 1 so that it becomes possible to generate the downward thrust force acting on the rotor 2 in the liner direction which passes the stator 3 and the magnetic balancer 7.

In the similar manner, with respect to the notch 13 and notch 14, the profile shape of these notches 13, 14 at the lower-side position of the rotary position of the rotor 2 are set symmetrical with respect to the center of rotation 21. By setting the shapes of the magnetic shield 8 and the magnetic balancer 9 which will be explained later together with the abovementioned setting of profiles, the magnetic flux from the magnet 25 reaches the bottom surface of the chassis 1 so that it becomes possible to set the downward thrust force acting on the rotor 2 to the linear direction which passes the magnetic shield 8 and the magnetic balancer 9.

Then, the shape of the stator core 31 is explained.

Figure 4:
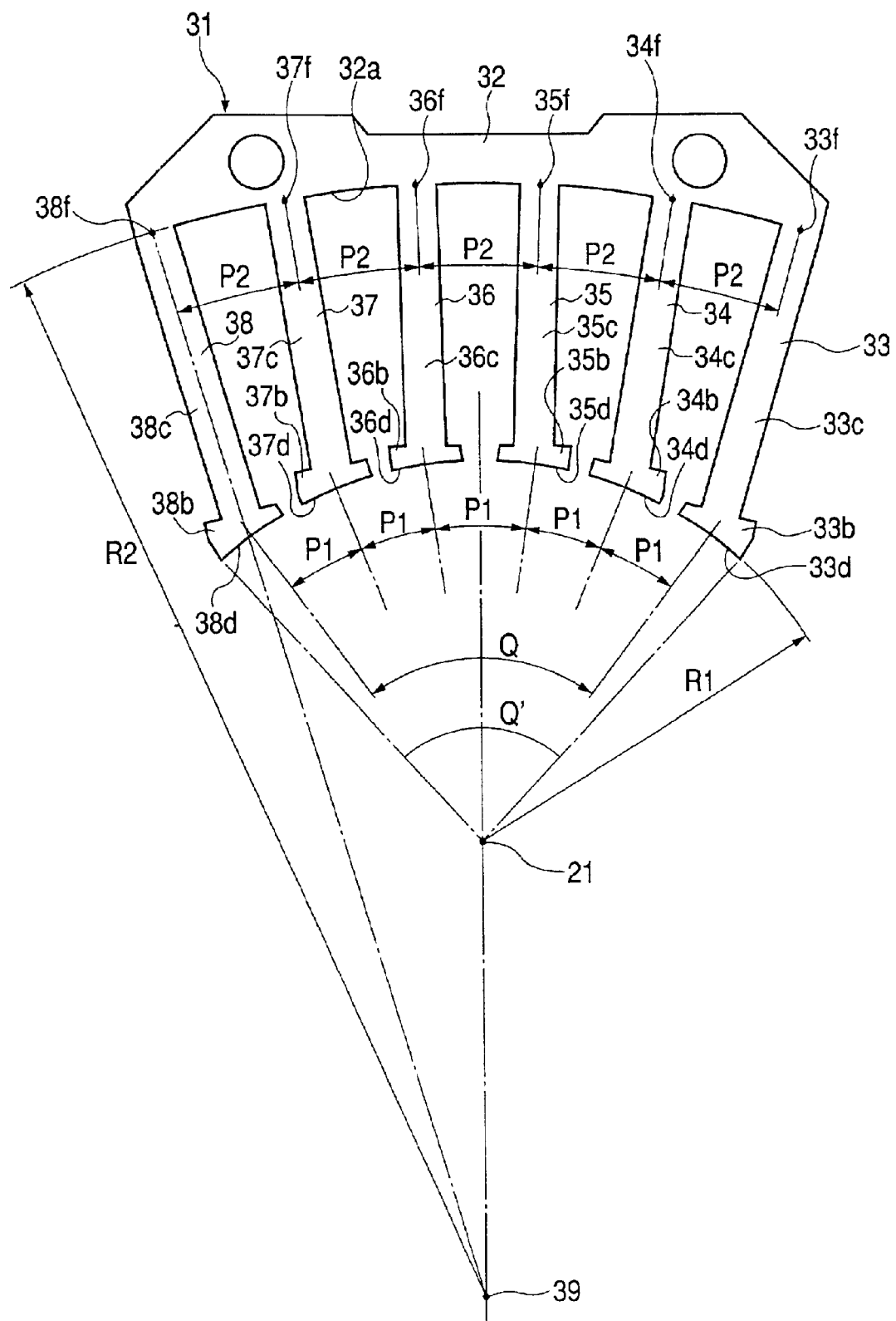
FIG. 4 is a plan view showing a stator core 31 shown in FIG. 1.

FIG. 4 is a plan view which shows the stator core 31 in FIG. 1.

The stator core 31 is made of silicon steel plate. As shown in FIG. 1 to FIG. 4, respective magnetic pole teeth 33 to 38 are respectively provided with distal ends 33b to 38b which are extended to the rotor 2 side from the coils 33a to 38a and respective winding portions 33c to 38c which form the coils 33a to 38a.

Respective winding portions 33c to 38c have respective width dimensions thereof set uniform along the entire extended length. The distal ends 33b to 38b are formed wider than respective winding portions 33c to 38c. Further, these distal ends 33b to 38b are formed in an arcuate shape in a plan view such that the rotor facing surfaces 33d to 38d face the magnet 25 of the rotor 2 in an opposed manner at an approximately equal interval.

With respect to the stator core 31, as shown in FIG. 2, the distal ends 33b to 38b are arranged at a low position compared to the magnet 25 of the rotor 2. That is, the center position of the distal ends 33b to 38b in the height direction (the direction along the axis of rotation of the rotor 2) of the ends 33b to 38b is positioned closer to the bottom surface side of the chassis 1 than the center position of the height direction of the magnet 25. In the meantime, the coils 33a to 38a are positioned in the inside of the notch 11 formed in the chassis The displacement value or the offset value of the center position of the height direction between the distal ends 33b to 38b and the magnet 25 is set such that a downward (toward the chassis 1 side) thrust load for maintaining the rotational stability of the rotor 2 can be set as in the case of setting of the height of the magnetic balancer 7 which will be explained later.

The magnetic pole teeth 33 to 38, as shown in FIG. 1, FIG. 3, FIG. 4 and FIG. 5, have rotor facing surfaces 33d to 38d thereof formed in an arcuate shape having a radius of R1 such that the rotor facing surfaces 33d to 38d becomes equidistant with respect to a point which is aligned with the center of rotation 21 of the rotor 2. Further, pitches P1 of these rotor facing surfaces 33d to 38d in the circumferential direction are respectively set equal. The pitches P1 of the rotor facing surfaces 33d to 38d correspond to distances between circumferential center positions 33g to 38g of the neighboring rotor facing surfaces 33d to 38d which are expressed by angles with respect to the center of rotation 21. The pitches P1 of the rotor facing surfaces 33d to 38d can be set to 15°, for example.

Here, a value Q which is an angle with respect to the center of rotation 21 expressing the distance between the circumferential center positions 33g to 38g of the rotor facing surface 33d and the rotor facing surface 38d at both ends is set such that the center angle with respect to the point which is aligned with the center of rotation 21 of the rotor 2 becomes 75°.

The yoke 32 makes a side thereof to which respective magnetic pole teeth 33 to 38 are connected, that is, a surface 32a at a side which faces the rotor 2 in an opposed manner, draw an arc in a plan view. As shown in FIG. 4, this surface 32a is formed in an arcuate shape having a radius R2 about a point 39 which is set at a position remote from the stator 3 rather than the point which is aligned with the center of rotation 21 of the rotor 2. Simultaneously, centers of proximal ends 33f, 38f of the magnetic pole teeth 33 and the magnetic pole teeth 38 which are connected to the surface 32a are respectively set to positions equally distant from the center of rotation 21. Further, the centers of proximal ends 34f, 37f of the magnetic pole teeth 34 and the magnetic pole teeth 37 are respectively set to positions equally distant from the center of rotation 21, and the centers of proximal ends 35f, 36f of the magnetic pole teeth 35 and the magnetic pole teeth 36 are respectively set to positions equally distant from the center of rotation 21. That is, the shape of the stator core 31 is set in a line symmetry with respect to a straight line L1 which passes the center of rotation 21 and the point 39.

Further, with respect to the magnetic pole teeth 33 to 38, as shown in FIG. 4, pitches P2 of the centers of proximal ends 33f to 38f are respectively set equal. In other words, the pitches P2 of the centers of proximal ends 33f to 38f correspond to the distance between the circumferential center positions along the surface 32a at the proximal ends of the neighboring magnetic pole teeth 33 to 38 which are expressed by angles with respect to the point 39. The pitches P2 of the centers of the proximal ends 33f to 38f are set to a value smaller than the pitches P1 of the rotor facing surfaces 33d to 38d. That is, the pitches P2 are set to 7°, for example.

Here, the pitches P2 of the centers of proximal ends 33f to 38f are set such that at least one of values of angles made by extending directions of the neighboring magnetic pole teeth 33 to 38 becomes smaller than angles which are made between straight lines which connect the rotor facing surfaces 33d to 38d of the neighboring magnetic pole teeth 33 to 38 and the center of rotation 21 of the rotor 2. That is, with respect to respective magnetic pole teeth 33 to 38, at least one value P2 among the angles which are made at the point 39 where the straight lines which respectively connect the centers of the proximal ends 33f to 38f and the circumferential center positions 33g to 38g of the rotor facing surfaces 33d to 38d are extended and cross each other is set to a value smaller than the angles P1 which are made by lines which connect the circumferential center positions 33g to 38g of the rotor facing surfaces 33d to 38d and the center of rotation 21.

Here, the point 39 is set such that the point 39 is disposed at a position outside the rotor 2.

Further, with respect to respective magnetic pole teeth 33 to 38, as shown in FIG. 4, respective winding portions 33c to 38c having the equal width in the extending direction are formed such that they are extended on straight lines which pass the center of proximal ends 33f to 38f and the point 39. In the drawing, the relationship between the winding portion 38c of the magnetic pole teeth 38 and the straight line which passes the center of proximal end 38f and the point 39 is indicated.

By setting the pitches P1, P2 in the abovementioned manner, lengths L33 to L35 and L36 to L38 of the winding portions 33c to 38c at respective magnetic pole teeth 33 to 38 are set such that they are different from each other. That is, as shown in FIG. 3 and FIG. 4, the length L33 of the winding portion 33c is set longer than the length L34 of the winding portion 34c, and the length L34 of the winding portion 34c is set longer than the length L35 of winding portion 35c. At the same time, the length L33 of the winding portion 33c is set equal to the length L38 of the winding portion 38c, the length L34 of the winding portion 34c is set equal to the length L37 of the winding portion 37c, and the length L35 of the winding portion 35c is set equal to the length L36 of the winding portion 36c. In other words, the lengths L33 to L38 are set to satisfy the following relationship.

L33=L38>L34=L37>L35=L36

With respect to the coils 33a to 38a, the number of turns N33 to N35 and N36 to N38 of respective windings are set such that they are different from each other. These number of turns N33 to N38 can be respectively set in proportion to the lengths L33 to L38 of the winding portions 33c to 38c. For example, the number of turns N33 is set larger than the number of turns N34 and the number of turns N34 is set larger than the number of turns N35. Further, the number of turns N33 and the number of turns N38 are set equal, the number of turns N34 and the number of turns N37 are set equal, and the number of turns N35 and the number of turns N36 are set equal. In other words, the numbers of turns N33 to N38 are set to satisfy the following relationship.

N33=N38≧N34=N37≧N35=N36

Further, with respect to respective coils 33a to 38a, corresponding to the rotor 2 which is constituted of 16 poles, connections are made corresponding to three phases (U phase, V phase, W phase), wherein the coil 33a is set to the U phase, the coil 34a is set to the W phase, the coil 35a is set to the V phase, the coil 36a is set to the U phase, the coil 37a is set to the W phase, and the coil 38a is set to the V phase.

Accordingly, the sum Nu of number of turns of the U phase is set to N33+N36, the sum Nv of number of turns of the V phase is set to N35+N38, and the sum Nw of number of turns of the W phase is set to N34+N37, wherein these sums are set equal to each other. That is, the sums of number of turns Nu, Nw and Nv are set to satisfy the following relationship.

Nu=Nw=Nv

Due to such setting of the number of turns, torques applied to the rotor 2 at three phases (U phase, Vphase, Wphase) can be set equal to each other.

Due to the abovementioned constitution, the stator 3 can be positioned at one side of the rotor 2. That is, the stator 3 can be positioned in a range in which the center angle Q with respect to a point which is aligned with the center of rotation 21 of rotor 2 is within 180° on a plane parallel to the rotary surface of the rotor 2. Further, the stator 3 maybe positioned in such a range where the center angle Q is within 90°.

In this manner, by setting the stator 3 within the center angle of 180°, compared to a case in which the stator is disposed around the entire periphery of the rotor 2, the area of the stator core in a plan view can be preferably reduced to approximately not more than half. Further, by setting the stator 3 within the center angle of 90°, the area of the stator core 31 can be reduced more preferably.

FIG. 5 is a schematic plan view showing the relationship between the magnet 25 and the magnet pole teeth 33 to 38 in FIG. 1.

Although the stator 3 and the rotor 2 are, as shown in FIG. 5, positioned such that the rotor facing surfaces 33d to 38d face the rotor 2 in an opposed manner, the relationship between respective magnetic pole teeth 33 to 38 and the magnet 25 is set as follows.

That is, as mentioned previously, respective magnetic poles 25n, 25s, . . . are provided in the circumferential direction of the rotor 2 in a state that the pitch is set to 22.5° with respect to the center of rotation 21. This pitch is indicated by P3 in FIG. 5. On the other hand, as mentioned previously, the pitches P1 of the rotor facing surfaces 33d to 38d in the circumferential direction are set to 15°, for example. That is, to 1 piece of each magnetic pole 25n, 25s, . . . of the rotor 2, for example, 1 piece of magnetic pole teeth 33 and a half of the magnetic pole teeth 34, that is, 1.5 pieces out of respective magnetic pole teeth 33 to 38 correspond. In the drawing, the magnetic pole teeth, 37, 38 are omitted.

That is, as shown in FIG. 5, the respective magnetic poles of the stator 3 and the rotor 2 are arranged such that when the circumferential center position (the center of distal end) 33g of the rotor facing surface 33d of the magnetic pole teeth 33 is arranged at a position which faces a boundary position 25a between the magnetic pole 25s0 and the magnetic pole 25n1 in an opposed manner, the circumferential center position 34g of the rotor facing surface 34d of the magnetic pole teeth 34 which is positioned adjacent to the magnetic pole teeth 33 is arranged at a position which faces a second position 25b counted from the magnetic pole 25s0 side when the pitch P3 of the magnetic pole 25n1 is divided in three in the circumferential direction. At the same time, the circumferential center position 35g of the rotor facing surface 35d of the next magnetic pole teeth 35 is arranged at a position which faces the first position 25c counted from the magnetic pole 25n1 side when the pitch P3 of the magnetic pole 25s1 is divided in three in the circumferential direction. Further, the circumferential center position 36g of the rotor facing surface 36d of the magnetic pole teeth 36 is set to be arranged at a position which faces a boundary position 25d between the next magnetic pole 25s1 and the magnetic pole 25n2 which follows the magnetic pole 25s1.

Here, shapes of the stator 3 and the rotor 2 in the three-phase motor are explained.

Figure 7:
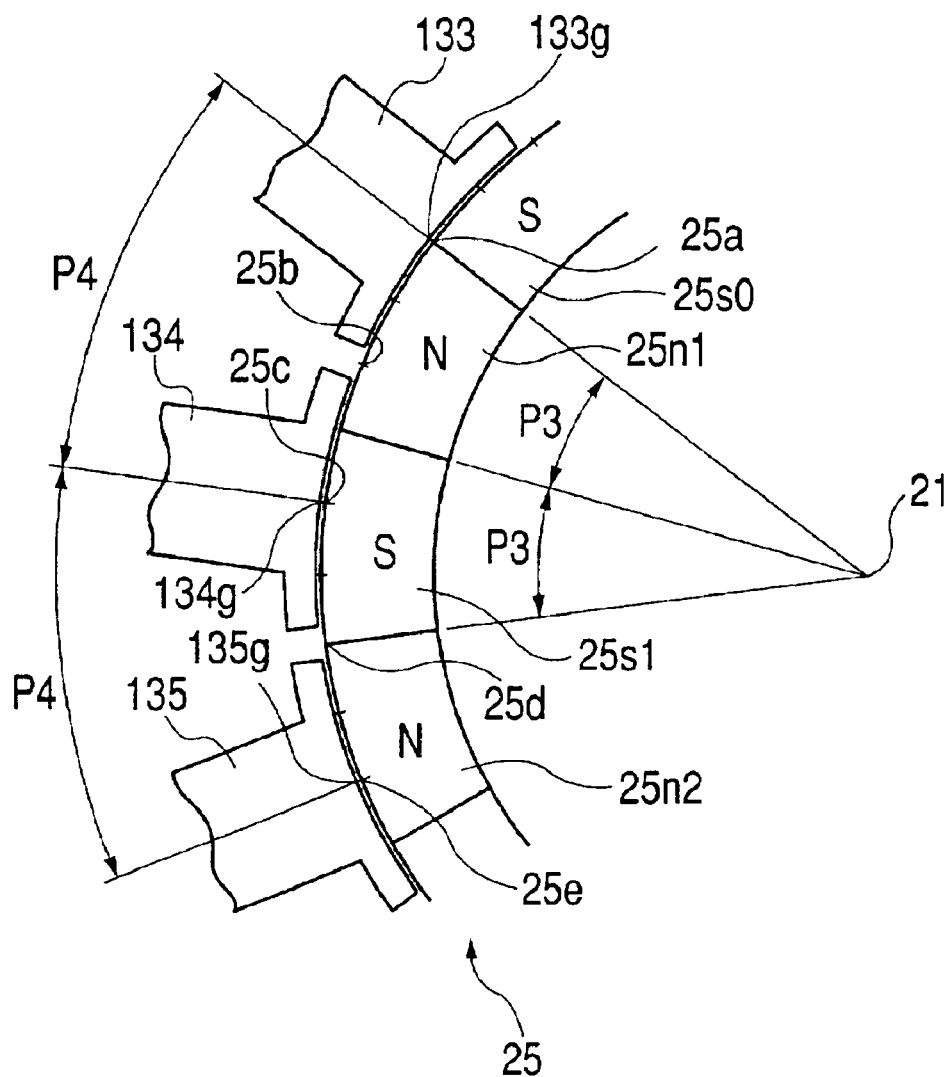
FIG. 7 is a schematic plan view for showing the relationship between a magnet 25 and magnetic pole teeth 133 to 136 in a conventional motor.

FIG. 7 is a schematic plan view showing the relationship between the magnet 25 and magnetic pole teeth 133 to 136 in a conventional motor. Here, for the sake of brevity, only three pieces of magnetic pole teeth are described and other magnetic pole teeth are omitted from the drawing, while the magnet has a structure which is similar to the structure of this embodiment shown in FIG. 5 and equivalent constitutional elements are given same numerals and the explanation of these elements is omitted.

In the conventional three-phase inner rotor motor shown in FIG. 7, with respect to an electrical angle which is set to 360° for pairs of magnetic poles 25n, 25s of a rotor, a U phase, a V phase and a W phase are respectively set such that the arrangement of respective magnetic pole teeth 133, 134, 135 exhibit the phase difference of the electrical angle of 120°.

To be more specific, in the same manner as the constitution shown in FIG. 5, when a circumferential center position 133g of a rotor facing surface of the magnetic pole teeth 133 is arranged at a position which faces a boundary portion 25a between the magnetic pole 25s0 and the magnetic pole 25n1 with respect to the magnet 25, a circumferential center position 134g of a rotor facing surface of the magnetic pole teeth 134 is arranged to a position which faces the first position 25c counted from the magnetic pole 25n1 side when a pitch P3 of the magnetic pole 25s1 is divided in three in the circumferential direction. At the same time, a circumferential center position 135g of a rotor facing surface of the magnetic pole teeth 135 is arranged at a position which faces the second position 25d counted from the magnetic pole 25s1 side when a pitch P3 of the magnetic pole 25n2 is divided in three in the circumferential direction.

In this manner, in the conventional three-phase inner rotor motor shown in FIG. 7, three magnetic pole teeth 133, 134, 135 are respectively arranged with a pitch P4 which is set to 30°, for example, with respect to the center of rotation 21. That is, when the magnetic pole teeth are provided around the entire periphery of the rotor 2 with the pitch P4 in the similar manner, the stator having 12 poles is formed. Here, in the conventional three-phase inner rotor motor shown in FIG. 7, the U phase coil to which the first driving current is supplied, the V phase coil to which the second driving current having a phase advanced by 120° compared to the first driving current is supplied and the W phase coil to which the third driving current which has a phase advanced by 120° compared to the second driving current is supplied are arranged in the order of the U phase, the V phase and the W phase.

To the contrary, in the inner rotor motor of this embodiment, the U phase, the V phase and the W phase are respectively set such that the arrangement of respective magnetic pole teeth 133, 134, 135 exhibit the phase difference of an electrical angle of 120°, the coil 33a is set to the V phase, the coil 34a is set to the W phase, the coil 35a is set to the V phase, the coil 36a is set to the U phase, the coil 37a is set to the W phase and the coil 38a is set to the V phase.

In this manner, the U phase coil to which the first driving current is supplied, the V phase coil to which the second driving current having a phase advanced by 120° compared to the first driving current is supplied and the W phase coil to which the third driving current which has a phase advanced by 120° compared to the second driving current is supplied are arranged in the order of the U-phase, the W phase and the V phase. Further, in this embodiment, the pitches P1 of the rotor facing surfaces 33d to 38d in the magnetic pole teeth 33 to 38 are set to 15°, for example. Accordingly, in this embodiment, when the magnetic pole teeth are provided to the entire periphery of the rotor 2 at such pitches P1, the stator having 24 poles is obtained.

Accordingly, in this embodiment, the number of magnetic pole teeth which are arranged per unit angle in the center angle with respect to the center of rotation 21 can be increased compared to the number of magnetic poles of the rotor 2. That is, in this embodiment, the angle density of the magnetic pole teeth 33 to 38 with respect to the center angle of the center of rotation 21 is largely set compared to the angle density of the magnetic poles 25n, 25s of the rotor 2. To the contrary, in the conventional three-phase inner rotor motor shown in FIG. 7, the number of magnetic pole teeth which are arranged per a unit angle within the center angle with respect to the center of rotation 21, is set small compared to the number of magnetic poles of the rotor. That is, in the conventional three-phase inner rotor motor shown in FIG. 7, the angle density of the magnetic pole teeth 133 to 138 within the center angle with respect to the center of rotation is set small compared to the angle density of the magnetic poles 25n, 25s of the rotor.

Accordingly, in the conventional three-phase inner rotor motor shown in FIG. 7, to provide six pieces of magnetic pole teeth, for example, the center angle at the center of rotation 21 of the rotor 2 requires a range of 120° so that the area of the stator which becomes necessary is increased correspondingly.

Further, when respective magnetic pole teeth 133, 134, 135 are provided on the straight lines which pass the center of rotation 21 and the circumferential center positions 133g, 134g, 135g. . . of the rotor facing surfaces, compared to the case in which respective magnetic pole teeth 133, 134, 135 are provided on the straight lines which pass the point 39 which is set at a position disposed away from the stator 3 than the center of rotation 21 as in the case of this embodiment, it becomes necessary to prolong the length of the yoke in the circumferential direction so that the area of the yoke cannot be reduced in a plan view whereby it is impossible to sufficiently reduce the area of the stator core 31.

As shown in FIG. 1, the magnetic balancer 7 for taking a magnetic balance with the stator 3 with respect to the rotor 2 is arranged at a position opposite to the stator 3 such that the rotor 2 is sandwiched between the stator 3 and the magnetic balancer 7.

As shown in FIG. 1 and FIG. 2, the magnetic balancer 7 is brought into contact with a notch 12 formed in the chassis 1 at a position of a rotor 2 rotation lower-side position. The magnetic balancer 7 is integrally formed with the bottom surface of the chassis 1 and is erected perpendicularly from the bottom surface of the chassis 1. The magnetic balancer 7 is provided in plural numbers around the rotational position of the rotor 2 such that the magnetic balancer 7 faces the circumferential surface of the magnet 25 of the rotor 2.

The magnetic balancer 7 is constituted of six magnetic balancers 71 to 76 corresponding to the rotor facing surfaces 33d to 38d of the stator 3 and these portions are arranged to such that respective rotor facing surfaces 71a to 76a are arranged in a point symmetry with the rotor facing surfaces 33d to 38d of the magnetic pole teeth 33 to 38 with respect to the center of rotation 21 of the rotor 2.

That is, in the magnetic balancer 71, the rotor facing surface 71a is arranged in a symmetry with the rotor facing surface 33d with respect to the center of rotation 21. In the magnetic balancer 72, the rotor facing surface 72a is arranged such that the rotor facing surface 72a assumes a position where the rotor facing surface 72a becomes symmetry with the rotor facing surface 34d with respect to the center of rotation 21. In the similar manner, the rotor facing surface 73a and the rotor facing surface 35d are arranged to take the symmetrical positions with respect to the center of rotation 21, the rotor facing surface 74a and the rotor facing surface 36d are arranged to take the symmetrical positions with respect to the center of rotation 21, the rotor facing surface 75a and the rotor facing surface 37d are arranged to take the symmetrical positions with respect to the center of rotation 21, and the rotor facing surface 76a and the rotor facing surface 38d are arranged to take the symmetrical positions with respect to the center of rotation 21.

This provision is made to balance the magnetic influence to the rotor 2 from the stator 3 making use of the shape of the magnetic balancer 7 and to set the magnetic balance with respect to the rotor 2 such that the magnetic balance can be maintained in the symmetrical state with respect to the center of rotation 21.

To be more specific, the rotor facing surfaces 71a to 76a are set in an arcuate shape having a radius R1' such that the rotor facing surfaces 71a to 76a are equally distant from the point 21 which is aligned with the center of rotation of the rotor 2. Although the radius R1' is set larger than a radius R1 which is set with respect to the rotor facing surfaces 33d to 38d, the radius R1' is set by taking the height of the magnetic balancer 7 which will be explained later into consideration. The pitches of the rotor facing faces 71a to 76a are set equal to each other, for example, 15°, in the same manner as the pitches P1 of the rotor facing surfaces 33d to 38d.

Further, the lengths of the rotor facing surfaces 71a to 76a in the circumferential direction are respectively set corresponding to the lengths of the rotor facing surfaces 33d to 38d of the magnetic pole teeth 33 to 38 with respect to the center of rotation 21 of the rotor 2.

That is, in the magnetic balancer 71, the length of the rotor facing surface 71a in the circumferential direction is set equal to the length of the rotor facing surface 33d in the circumferential direction and, in the magnetic balancer 72, the length of the rotor facing surface 72a in the circumferential direction is set equal to the length of the rotor facing surface 34d in the circumferential direction. In the same manner, in the magnetic balancer 73, the length of the rotor facing surface 73a in the circumferential direction is set equal to the length of the rotor facing surface 35d in the circumferential direction, in the magnetic balancer 74, the length of the rotor facing surface 74a in the circumferential direction is set equal to the length of the rotor facing surface 36d in the circumferential direction, in the magnetic balancer 75, the length of the rotor facing surface 75a in the circumferential direction is set equal to the length of the rotor facing surface 37d in the circumferential direction, and in the magnetic balancer 76, the length of the rotor facing surface 76a in the circumferential direction is set equal to the length of the rotor facing surface 38d in the circumferential direction.

The magnetic balancer 7 is disposed at a position lower than a position where the rotor 2 is disposed. In other words, the center position of the magnetic balancer 7 in the height direction is set lower than the center position of the magnet 25 of the rotor 2 in the direction of the rotating axis of the magnet 25. Then, the magnetic balancers 71 to 76 are set at an approximately uniform height and are set lower than an upper surface 26 of the magnet 25 of the rotor 2. Alternatively, upper ends 71b to 76b of the magnetic balancer 7 are, as shown in FIG. 2, are set closer to the bottom surface of the chassis 1 than the upper surface 26 of the magnet 25 of the rotor 2.

The height of the magnetic balancer 7, that is, the differences between the upper ends 71b to 76b of the magnetic balancers 71 to 76 and the upper surface 26 of the magnet 25 are determined to set the downward thrust load (toward the chassis 1) to maintain the rotational stability of the rotor 2 simultaneously with the setting of offset values between the distal ends 33b to 38b and the center position of the magnet 25 in the height direction.

Here, the manner of setting the shape of the magnetic balancer 7 is explained.

As shown in FIG. 2B, a force F3 acts between the rotor 2 and the stator 3 and, at the same time, a force F7 acts between the rotor 2 and the magnetic balancer 7. This force F3 acts in a state in which the force F3 is inclined toward the bottom surface side of the chassis 1 than the rotary plane of the rotor 2. This is because, with respect to the rotor 2, the force F3 acts in the direction toward the distal ends 33b to 38b disposed at the low positions compared to the magnet 25 of the rotor 2. Further, the force F7 acts in a state in which the force F7 is inclined toward the bottom surface side of the chassis 1 than the rotary plane of the rotor 2. This is because, with respect to the rotor 2, the force F7 acts in the direction toward the magnetic balancer 7 disposed at the low positions compared to the magnet 25 of the rotor 2.

Here, the force F3 and the force F7 generate rotary moments to the rotor 2 with respect to the bearings 22 and hence, these forces F3, F7 must meet a following equation (1) to ensure the stable rotation of the rotor 2 without generating the inclination of the rotor 2.

$$F7t \cdot (RA-RB) < F3t \cdot (RA+RB)$$

$$F3t \cdot (RA-RB) < F7t \cdot (RA+RB) \quad (1)$$

Here, as shown in FIG. 2A and FIG. 2B, $F3t = F3 \cos \theta_1$ (vertical-direction component of $F3$)

$F7t = F7 \cos \theta_2$ (vertical-direction component of $F7$)

RA: radius of outer peripheral surface of magnet 25 with respect to the center of rotation 21

RB: radius of rotation of bearing 22 with respect to the center of rotation 21

By setting the forces F3, F7 in the above manner, the forces F3, F7 can give a thrust force to stabilize the rotation of the rotor 2 to the rotor 2 due to the sum of the force F3t and the force F7t with respect to the rotary axis direction of the rotor 2. That is, the rotor 2 has the periphery thereof pressed toward the bottom surface of the chassis 1.

Here, the magnetic fluxes generated by the magnets 25 respectively enters the bottom surface of the chassis 1 through a portion between the notch 11 and the notch 14, a portion between the notch 14 and the notch 12, a portion between the notch 12 and the notch 13 and a portion between the notch 13 and the notch 11 and hence, the downward thrust force acts on the rotor 2.

Accordingly, the forces F3, F7 are set such that the downward force ensures the rotational stability of the rotor 2 and, at the same time, the downward force is set to a level which does not obstruct the driving characteristics of the rotor 2 due to the influence such as friction caused by the increase of the thrust force on the rotary shaft of the rotor 2.

At the same time, these forces F3, F7 are set such that a force F7p is set larger than a force F3p in the direction perpendicular to the rotary shaft of the rotor 2, that is, in the direction parallel to the bottom portion of the chassis 1. To be more specific, as shown in FIG. 2B, the leftward force F3p is set smaller than the rightward force F7p. Due to such a setting, a rightward force F2 shown in FIG. 2B, that is, a force which is directed from the stator 3 side to the magnetic balancer 7 side is given to the rotary axis 21 of the rotor 2 so that the stability of the rotary axis 21 of the rotor 2 is ensured.

As parameters served for setting the abovementioned forces F3 and F7, followings are considered.

Areas of rotor facing surfaces 33d to 38d

Distance between rotor facing surfaces 33d to 38d and outer peripheral surfaces of magnet 25

Position of height between rotor facing surfaces 33d to 38d and magnet 25

Areas of rotor facing surfaces 71a to 76a

Distance between rotor facing surfaces 71a to 76a and outer peripheral surfaces of magnet 25

Position of height between rotor facing surfaces 71a to 76a and magnet 25

The forces F3 and F7 can be set to the optimum state by combining these parameters.

As shown in FIG. 1, the magnetic head 4 is constituted of a first head 41 and a second head 42 which are formed above and below the disk for reading magnetic signals from a disk and writing the magnetic signals to the disk. The first head 41 and the second head 42 are mounted on a head carriage 43. The positions of these first and second heads 41, 42 are controlled by the position controller 5.

As shown in FIG. 1, the position controller 5 includes a stepping motor 51 for feeding the head carriage 43. The stepping motor 51 is held at a rear center of the chassis 1 and is constituted as a drive source which drives the head carriage 43 in the back and forth direction. An output shaft of the stepping motor 51 is formed of a lead screw rod 52 which is extended in the back and forth direction and has a spirally-formed V-shaped groove. A distal end of the output shaft is supported on a bearing. A guide rod 53 is arranged parallel to the lead screw rod 52. The guide rod 53 is held at a rear center of the chassis 1 and is configured to guide the head carriage 43 which will be explained later in the back and forth direction.

The head carriage 43 includes a needle pin 54 which is projected in the oblique rearward direction and a leaf spring which brings the needle pin 54 into pressure contact with the inside of the V-shaped groove of the lead screw rod 52. The head carriage 43 is reciprocably inserted in the guide rod 53 such that the guide rod 53 passes through the head carriage 43 and the head carriage 43 is disposed above the chassis 1. The magnetic head 41 which performs the reading of the record information on the disk is held at a distal end of the head carriage 43, while the head arm 55 having the magnetic head 42 which corresponds to the magnetic head 41 is tiltably mounted on a rear upper end of the head carriage 43 by way of a resilient body. The head arm 55 is rotatably biased by a torsion spring 56 in the direction that the magnetic head 42 approaches the magnetic head 41. A stopper for restricting the rotation of the arm which projects in the side direction is integrally formed with one-side periphery of the head arm 55.

The position controller 5, chips 61, 61 which constitute a controller for performing a drive control of the inner rotor motor, a capacitor 62 and the like are mounted on the board 6.

On the magnetic head 4 side of the rotor 2, a magnetic shield 8 which shields the magnetic flux from the magnet 25 to the magnetic heads 41, 42 is mounted.

Figure 6:
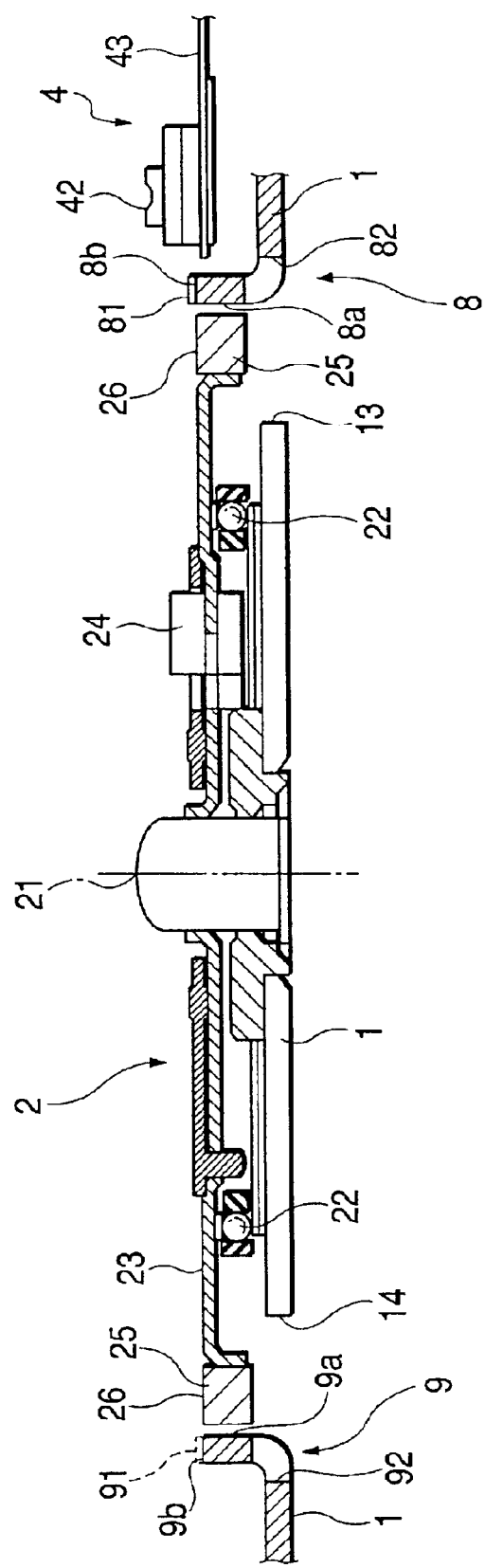
FIG. 6 is a cross-sectional view taken along a line VI—VI of FIG. 1 showing a magnetic shield of the inner rotor motor.

FIG. 6 is a cross-sectional view taken along a line VI—VI showing the magnetic shield 8 of the inner rotor motor in FIG. 1 as viewed in an arrow direction.

As shown in FIG. 1 and FIG. 6, the magnetic shield 8 is brought into contact with the notch 13 formed at the rotor 2 rotation lower side position of the chassis 1. The magnetic shield 8 is integrally formed with the bottom surface of the chassis 1 and is erected perpendicularly from the bottom surface of the chassis 1 and is provided around the rotation position of the rotor 2 such that the magnetic shield 8 faces the circumferential surface of the magnet 25 of the rotor 2 in an opposed manner.

The magnetic shield 8 is formed in a straight line in a plan view and the length of the magnetic shield 8 is set such that the magnet 25 of the rotor 2 is hidden when the rotor 2 is viewed from the magnetic head 42. That is, the magnet shield 8 may be set to the length which enables the magnetic shield 8 to perform the shielding for preventing the magnetic flux from the magnet 25 from influencing the operation of the magnetic heads 41, 42.

The magnetic shield 8 formed in a straight line has a center thereof positioned closest to the rotor 2 and the distance between the rotor facing surface 8a and the magnet 25 is set to become large at both ends of the magnetic shield 8 and shortest at the center.

Due to such a constitution, even when the length of the magnetic shield 8 is different from the length corresponding to two neighboring magnetic poles 25n, 25s of the magnet 25 shown in FIG. 5, it becomes possible to prevent the magnetic flux which enters the magnetic shield 8 from the magnet 25 of the rotating rotor 2 from being sharply increased or decreased. Accordingly, the magnetic flux can be gently changed up to the maximum value and hence, the occurrence of cogging can be prevented whereby the detent torque of the rotor 2 can be decreased.

Here, the optimum length of the magnetic shield 8 for preventing the occurrence of cogging may be set to a length corresponding to and substantially equal to the length of two neighboring magnetic poles 25n, 25s of the magnet 25 shown in FIG. 5. However, when the length is set to a length substantially equal to the length of two neighboring magnetic poles 25n, 25s of the magnet 25 shown in FIG. 5, the size of the notch 13 is increased corresponding to the length of the magnetic shield 8. This may reduce the strength of the shield 1.

To cope with such a problem, when the length of the magnetic shield 8 is made shorter than two neighboring magnetic poles 25n, 25s of the magnet 25 so as to prevent the cogging and to maintain the strength of the chassis 1, it is necessary to set the length of the magnetic shield 8 such that the distance between the rotor facing surface 8a of the magnetic shield 8 and the rotary surface of the rotor 2 is moderately increased or decreased whereby it becomes possible to prevent the cogging without lowering the strength.

As shown in FIG. 6, the upper end 8b of the magnetic shield 8 is set substantially coplanar with the upper surface 26 of the magnet 25 of the rotor 2. Here, the size of the rotor facing surface 8a in the height direction is set substantially equal to the size of the magnet 25 in the height direction. Due to such a constitution, the magnetic shield 8 can shield the magnetic flux from the magnet 25 and hence, the magnetic shield 8 can prevent the magnetic flux from the magnet 25 from influencing the operation of the magnetic head 42. The shape of the magnetic shield 8 is set such that the magnet 25 exerts an attracting force only in the horizontal direction thus reducing the vertical load applied to the rotor 2.

That is, by setting the shape of this portion, it becomes possible to set the vertical load applied to the rotor 2.

A magnetic balancer 9 is arranged at a position opposite to the magnetic shield 8 while sandwiching the rotor 2 between the rotor 2 and the magnetic shield 8 to establish the magnetic balance with the magnetic shield 8 with respect to the rotor 2.

As shown in FIG. 1 and FIG. 6, the magnetic balancer 9 is brought into contact with the notch 14 formed at the rotor 2 rotation lower side position of the chassis 1. The magnetic balancer 9 is integrally formed with the bottom surface of the chassis 1 and is erected perpendicularly from the bottom surface of the chassis 1 and is provided around the rotation position of the rotor 2 such that the magnetic balancer 9 faces the circumferential surface of the magnet 25 of the rotor 2 in an opposed manner.

The magnetic balancer 9 is formed corresponding to the magnetic shield 8 and is arranged in a point symmetry with the magnetic shield 8 with respect to the center of rotation 21 of the rotor 2.

That is, the magnetic balancer 9 which is formed in a straight line has a length thereof set equal to the length of the magnetic shield 8 and takes a position with respect to the magnet 25 of the rotor 2 in the same manner as the magnetic shield 8. That is, the magnetic balancer 9 has a center thereof positioned closest to the rotor 2 and the distance between the rotor facing surface 9a and the magnet 25 is set large at both ends of the magnetic balancer 9 and shortest at the center of the magnetic balancer 9.

Further, as shown in FIG. 6, the upper end 9b of the magnetic balancer 9 is set coplanar with the upper surface 26 of the magnet 25 of the rotor 2. Here, the size of the rotor facing surface 9a in the height direction is, in the same manner as the rotor facing surface 8a of the magnetic shield 8, set equal to or larger than the size of the magnet 25 in the height direction.

Further, through holes 82, 92 are formed in the chassis 1 at the proximal portions of the magnetic shield 8 and the magnetic balancer 9. These through holes 82, 92 are provided for reducing the stress which influences the bottom surface of the chassis 1 at the time of forming the magnetic shield 8, the magnetic balancer 9 and the chassis 1 by folding using a press. The chassis 1 may not be provided with these through holes 82, 92.

In this manner, by making the magnetic balancer 9 have a point symmetrical shape with the magnetic shield 8 with respect to the center of rotation 21 of the rotor 2, the magnetic balancer 9 can balance the magnetic influence from the magnetic shield 8 with respect to the rotor 2 so that it becomes possible to establish the magnetic balance with respect to the rotor 2 and to maintain the symmetrical state with respect to the center of rotation 21.

As shown in FIG. 1, FIG. 2 and FIG. 6, the magnetic balancer 7, the magnetic shield 8 and the magnetic balancer 9 are respectively provided with a projection-type cartridge supporting portions 77, 81, 91 which are protruded above the upper surface 26 of the magnet 25 of the rotor 2 at respective upper ends 7b, 8b, 9b thereof. These cartridge supports 77, 81, 91 are provided for supporting a disk cartridge such as a floppy disk in such a manner that the disk cartridge is prevented from being brought into contact with a rotating portion of the rotor 2 even when the disk cartridge is thermally deformed or the like. Accordingly, the upper ends of these cartridge supports 77, 81, 91 are set to the height which does not obstruct the disk rotating operation of the rotor 2 and at which the cartridge does not obstruct the rotation of the rotor 2.

With respect to the inner rotor motor and the disk device of this embodiment, the stator 3 is positioned at one side of the rotor 2. That is, the stator 3 is positioned in a range in which the center angle Q with respect to a point which is aligned with the center of rotation 21 of the rotor 2 is within 180° on a plane parallel to the rotary surface of the rotor 2. Further, the stator 3 is preferably positioned in such a range where the center angle Q is within 90°. Due to such an arrangement of the stator 3, compared to a structure in which a stator is disposed around the entire periphery of a rotor as in the case of a conventional inner rotor motor, the area of the stator core can be reduced to approximately not more than a half so that, the cost incurred by the stator core made of silicon steel, for example, and the cost incurred by the winding of the coil or the like can be reduced whereby the manufacturing cost of the inner rotor motor can be reduced.

At the same time, compared to the case in which the stator is provided to the entire periphery of the rotor, the area necessary for mounting the motor can be reduced so that the inner rotor motor can be miniaturized and can be light-weighted due to the reduction of the number of magnetic pole teeth.

Further, according to the disk device of this embodiment, the area necessary for mounting the motor can be reduced so that the disk device can be miniaturized and can be light-weighted due to the reduction of the number of magnetic pole teeth.

In the inner rotor motor and the disk device of this embodiment, the magnetic balancer 7 is provided to the outside of the circumference of the rotor 2 to take the magnetic balance with the stator 3 with respect to the rotor 2. Accordingly, even when the stator 3 is arranged only at one side of the rotor 2 and the rotor 2 is driven from only one side, the forces which act on the rotor 2 can be arranged symmetrically with a good balance with respect to the rotary axis of the rotor 2 so that it becomes possible to sufficiently maintain the rotational driving stability of the rotor 2.

The magnetic balancer 7 in this embodiment is brought into contact with the notch 12 which is formed in the chassis 1 at the rotor 2 rotation lower-side position, is integrally formed with the bottom surface of the chassis 1 and is perpendicularly erected from the bottom surface of the chassis 1. Accordingly, at the time of manufacturing the chassis 1 made of galvanized steel plate, for example, the notch 12 portion can be folded and erected toward the rotor 2 mounting side by press blanking at the rotor 2 lower-side position so that the magnetic balancer 7 and the chassis 1 can be simultaneously formed. Accordingly, compared to a case in which the magnetic balancer is mounted as a separate member, the manufacturing process can be simplified and the manufacturing cost can be reduced by saving the material cost.

The magnetic balancer 7 of this embodiment is formed of a plurality of magnetic balancers 71 to 76 which are separated in the circumferential direction of the rotor 2. Accordingly, in forming the magnetic balancer 7 by folding and erecting the chassis 1 made of the galvanized steel plate as mentioned above, for example, at the time of forming the rotor facing surfaces 71a to 76a which are curved corresponding to the outer peripheral surface of the rotor 2, the deformation or the like of the bottom surface of the chassis 1 can be prevented so that working of the magnetic balancer 7 is facilitated. Further, at the time of establishing the magnetic balance between the balancer 7 and the magnetic pole teeth 33 to 38 which are arranged in a spaced apart manner in the circumferential direction of the rotor 2, the magnetic symmetry between the magnetic pole teeth 33 to 38 and the arrangement of these magnetic balancers 71 to 76 can be easily realized.

In the magnetic balancer 7 of this embodiment, the arrangement of the magnetic balancers 71 to 76 and the arrangement of the rotor facing surfaces 33d to 38d of the magnetic pole teeth 33 to 38 are set symmetrically with respect to the center of rotation 21 of the rotor 2, and the sum of lengths which the rotor facing surfaces 71a to 76a occupy with respect to the outer periphery of the magnet 25 and the sum of lengths which the rotor facing surfaces 33d to 38d of the magnetic pole teeth 33 to 38 occupy with respect to the outer periphery of the magnet 25 are set equal. Accordingly, the actions which the magnetic balancer 7 and the stator 3 give to the rotor 2 can be set symmetrically with respect to the center of rotation 21 of the rotor 2 more easily.

With respect to the magnetic balancer 7, in the magnetic balancer 71, the rotor facing surface 71a is arranged to assume the position which is symmetrical with the rotor facing surface 33d with respect to the center of rotation 21 and the length of the rotor facing surface 71a in the circumferential direction is set equal to the length of the rotor facing surface 33d in the circumferential direction. In the magnetic balancer 72, the rotor facing surface 72a is arranged to assume the position which is symmetrical with the rotor facing surface 34d with respect to the center of rotation 21 and the length of the rotor facing surface 72a in the circumferential direction is set equal to the length of the rotor facing surface 34d in the circumferential direction. In the same manner, in the magnetic balancer 73, the rotor facing surface 73a is arranged to assume the position which is symmetrical with the rotor facing surface 35d with respect to the center of rotation 21 and the length of the rotor facing surface 73a in the circumferential direction is set equal to the length of the rotor facing surface 35d in the circumferential direction. In the magnetic balancer 74, the rotor facing surface 74a is arranged to assume the position which is symmetrical with the rotor facing surface 36d with respect to the center of rotation 21 and the length of the rotor facing surface 74a in the circumferential direction is set equal to the length of the rotor facing surface 36d in the circumferential direction. In the magnetic balancer 75, the rotor facing surface 75a is arranged to assume the position which is symmetrical with the rotor facing surface 37d with respect to the center of rotation 21 and the length of the rotor facing surface 75a in the circumferential direction is set equal to the length of the rotor facing surface 37d in the circumferential direction. In the magnetic balancer 76, the rotor facing surface 76a is arranged to assume the position which is symmetrical with the rotor facing surface 38d with respect to the center of rotation 21 and the length of the rotor facing surface 76a in the circumferential direction is set equal to the length of the rotor facing surface 38d in the circumferential direction. Accordingly, in designing a magnetic circuit, the actions which the magnetic balancer 7 and the magnetic pole teeth 33 to 38 give to the rotor 2 can be more easily set symmetrically.

Although the magnetic balancer 7, the magnetic shield 8 and the magnetic balancer 9 are respectively formed as separate structures as described above in this embodiment, as shown in FIG. 8, it is possible to adopt a structure in which a magnetic balancer 80 also functions as a magnetic shield and a magnetic balancer 90 also functions as a magnetic balancer for the magnetic shield.

Figure 8:
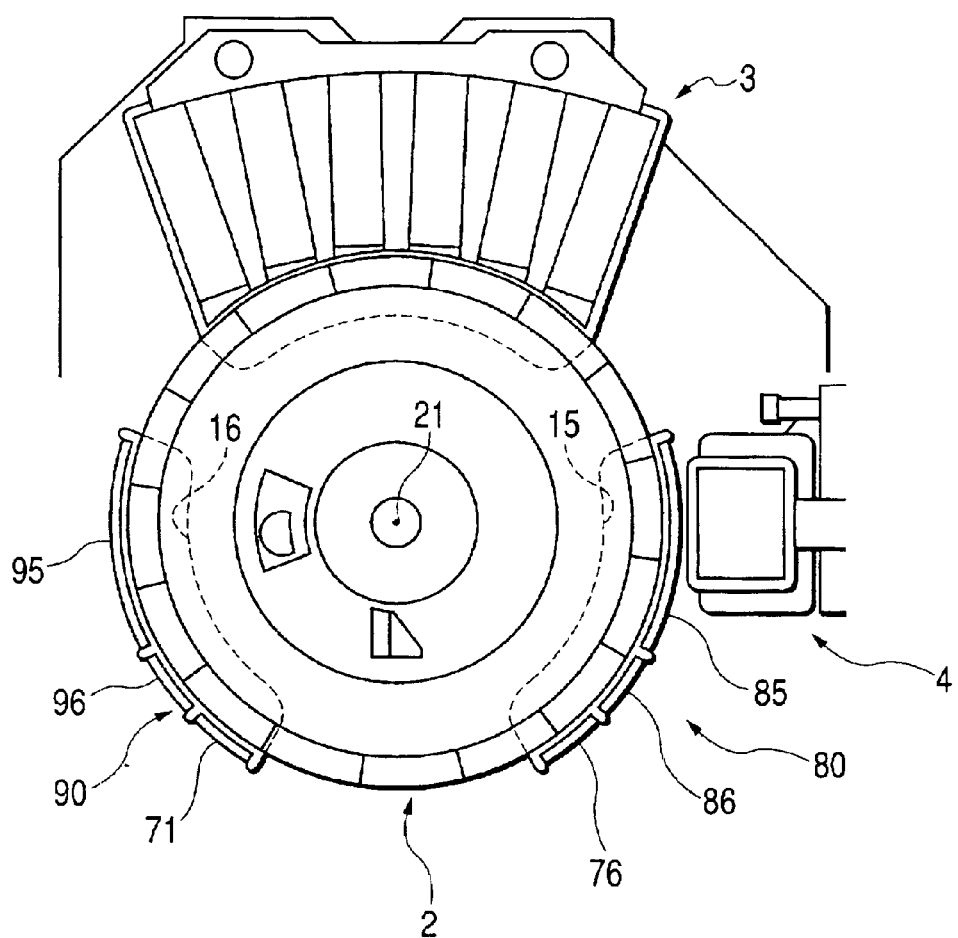
FIG. 8 is a plan view showing another embodiment of a magnetic shield and a magnetic balancer according to the present invention.

Here, as shown in FIG. 8, the magnetic balancer 80 is brought into contact with a notch 15 formed at a rotor 2 rotation lower side position of a chassis 1. The magnetic balancer 80 is integrally formed with the bottom surface of the chassis 1 and is erected perpendicularly from the bottom surface of the chassis 1 and is provided around the rotation position of the rotor 2 such that the magnetic balancer 80 faces the circumferential surface of the magnet 25 of the rotor 2 in an opposed manner.

The magnetic balancer 80 is constituted of a plurality of portions. That is, the magnetic balancer 80 includes a magnetic shield portion 85 which is provided corresponding to the magnetic head 4 and magnetic balancers 86, 76 which are arranged adjacent to the magnetic shield portion 85.

The length of the magnetic shield portion 85 in the circumferential direction is set equal to a length corresponding to two neighboring magnetic poles 25n, 25s of the magnet 25 so that there is no possibility that the cogging occurs.

A balancer 90 is provided at a position which faces the magnetic balancer 80 in an opposed manner while sandwiching the rotor 2 between the magnetic balancer 80 and the magnetic balancer 90 for establishing the magnetic balance with the magnetic balancer 80 with respect to the rotor 2.

As shown in FIG. 8, the magnetic balancer 90 is brought into contact with a notch 16 formed at the rotor 2 rotation lower-side position of a chassis 1. The magnetic balancer 90 is integrally formed with the bottom surface of the chassis 1 and is erected perpendicularly from the bottom surface of the chassis 1 and is provided around the rotation position of a rotor 2 such that the magnetic balancer 90 faces the circumferential surface of the magnet 25 of the rotor 2 in an opposed manner.

The magnetic balancer 90 is constituted corresponding to the magnetic balancer 80 and includes a magnetic balancer 95 which is arranged in a point symmetry with the magnetic shield 85 with respect to the center of rotation 21 of the rotor 2.

That is, the magnetic balancer 95 has a length thereof set equal to the length of the magnetic shield 85 and the position of the magnetic balancer 95 with respect to the magnet 25 of the rotor 2 is set equal to the position of the magnetic shield 85 with respect to the magnet 25 of the rotor 2.

Further, these magnetic balancers 80, 90 are arranged to establish the magnetic balance with the stator 3 with respect to the rotor 2 by synthesizing their magnetic influence.

Here, the distance between the notch 15 and the notch 16 is set large compared to the distance between the notch 12 and the notch 13 or the distance between the notch 12 and the notch 14 shown in FIG. 1. Accordingly, the downward thrust force which acts on the rotor 2 which is generated when the magnetic flux from the magnet 25 enters the bottom surface of the chassis 1 is increased so that upper ends of the magnetic balancers 80, 90 are set at positions higher than the upper end of the magnetic balancer 7.

Figure 9:
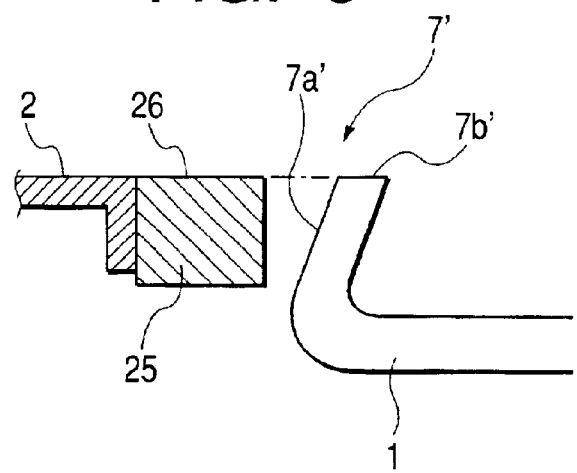
FIG. 9 is a cross-sectional view showing another embodiment of the magnetic balancer according to the present invention.
Figure 10:
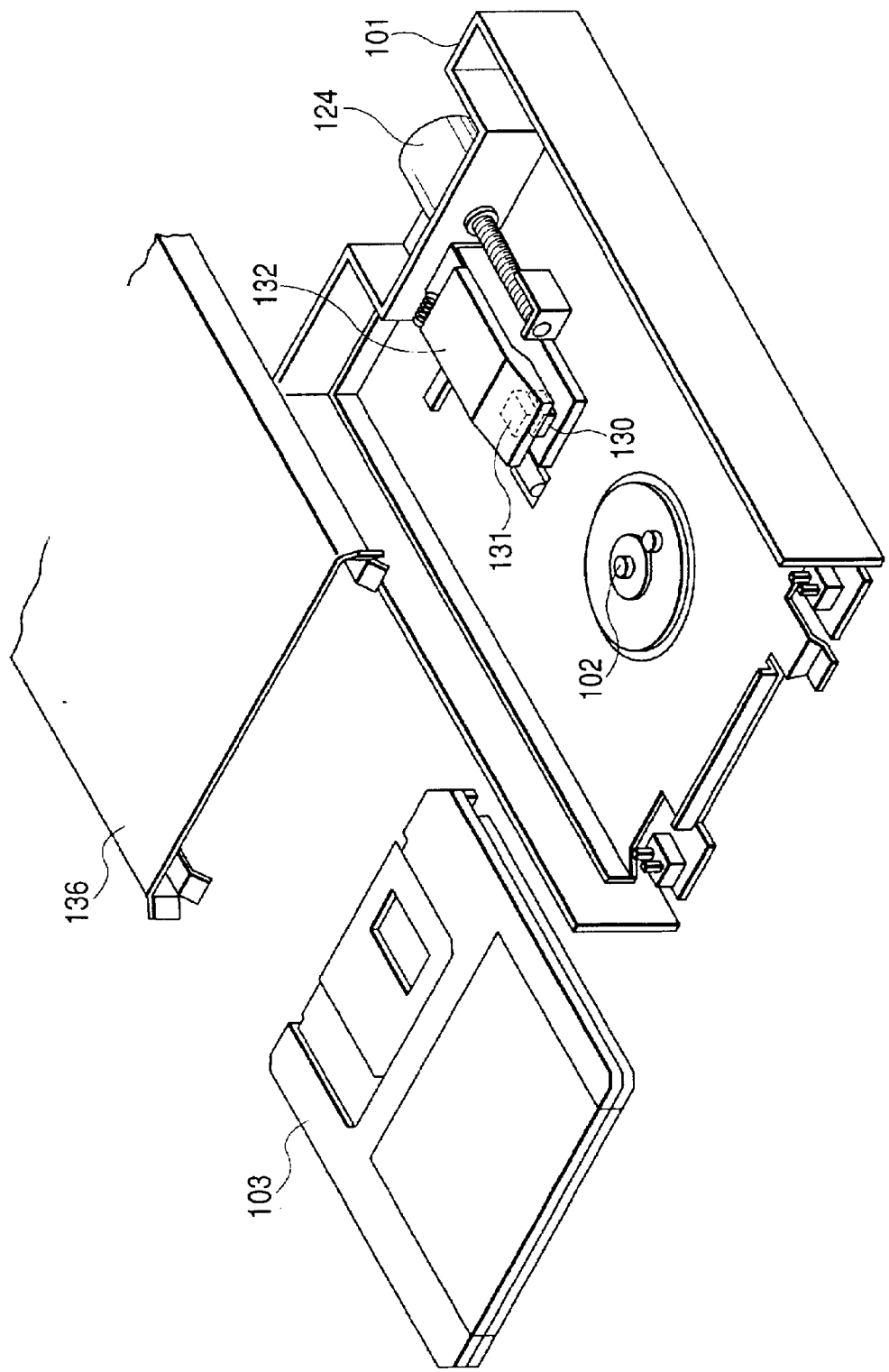
FIG. 10 is a schematic perspective view showing a conventional disk device.
Figure 11A:
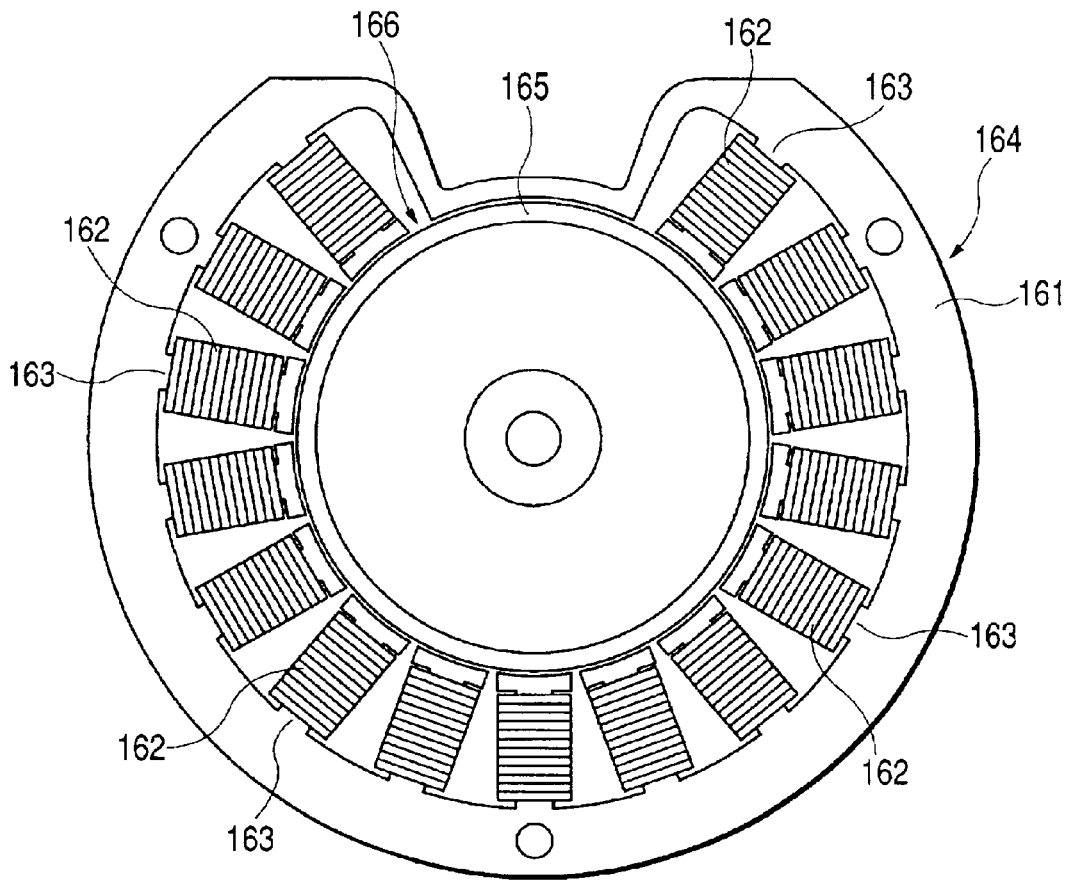
FIG. 11A is a plan view showing a conventional inner rotor motor.
Figure 11B:
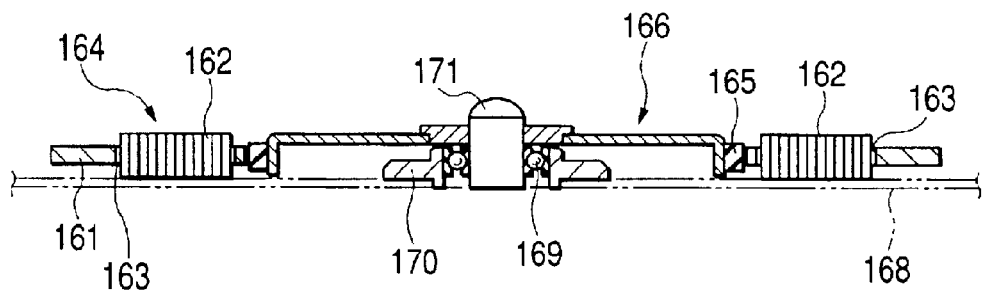
FIG. 11B is a cross-sectional view of the conventional inner rotor motor.

In the same manner, in a structure in which an oblique downward force such as the force F7 shown in FIG. 2B acts between the rotor 2 and the magnetic balancer 7, as shown in FIG. 9, a magnetic balancer 7' may set an upper end 7b' thereof coplanar with an upper surface 26 of the magnet 25 of the rotor 2 and may make a rotor facing surface 7a' inclined in the direction away from the outer periphery of the rotor 2 from a proximal end to a distal end thereof. That is, since the distance between the rotor facing surface 7a' and the outer periphery of the magnet 25 is decreased from the upper side to the lower side, the oblique downward force acts between the rotor 2 and the magnetic balancer 7'.

What is claimed is:

1. An inner rotor motor comprising a rotor which includes a plurality of magnetic poles arranged circumferentially and a stator which is positioned outside a circumference of the rotor, has a stator core which includes six magnetic pole teeth which face the rotor in an opposed manner and arranges coils on respective magnetic pole teeth, wherein said stator is arranged within 180° with respect to a center angle of the rotor, wherein pitches of the magnetic pole teeth in a rotor circumferential direction along which respective rotor facing surfaces of the magnetic pole teeth are arranged are set smaller than pitches of the rotor in the rotor circumferential direction along which the magnetic poles of the rotor are arranged.

2. An inner rotor motor according to the claim 1, wherein the pitches of the rotor in the rotor circumferential direction along which the magnetic poles of the rotor are arranged are set 1.5 times greater than the pitches of the magnetic pole teeth in the rotor circumferential direction along which respective rotor facing surfaces are arranged.

3. A disk device including the inner rotor motor according to claim 1.

* * * * *